July 26, 1938.  C. L. BEAL  2,124,871
METHOD AND APPARATUS FOR MOLDING ARTICLES
Filed Dec. 9, 1933  2 Sheets-Sheet 1
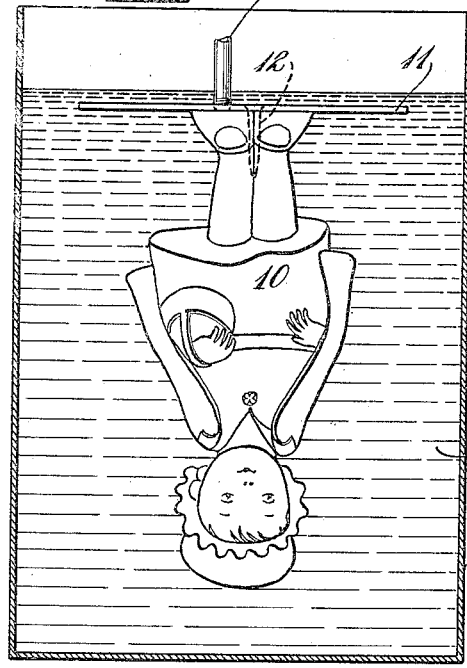
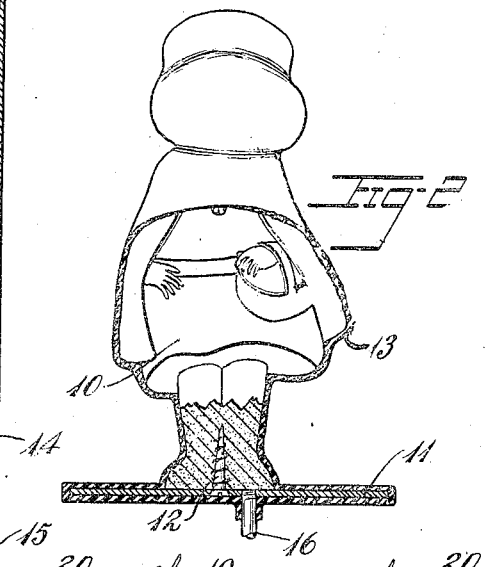
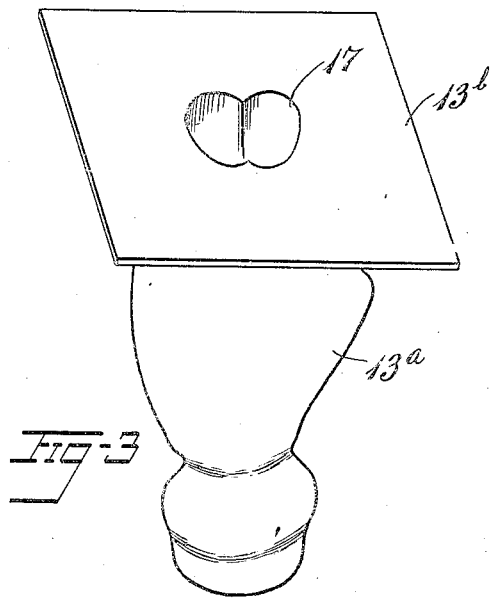
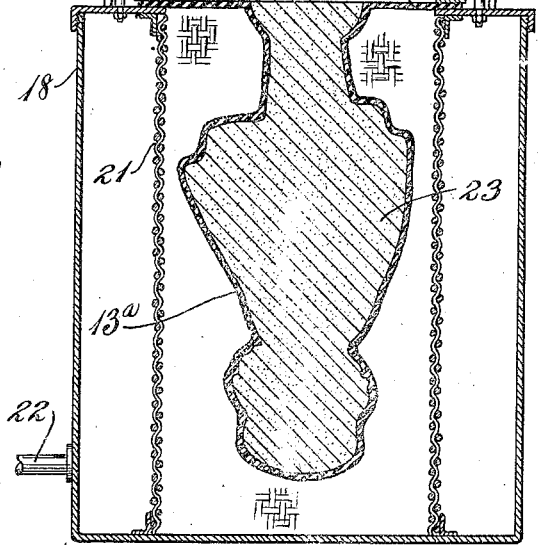
Inventor
Carl L. Beal
By Eakin & Avery
Attys.

July 26, 1938. C. L. BEAL 2,124,871
METHOD AND APPARATUS FOR MOLDING ARTICLES
Filed Dec. 9, 1933   2 Sheets—Sheet 2
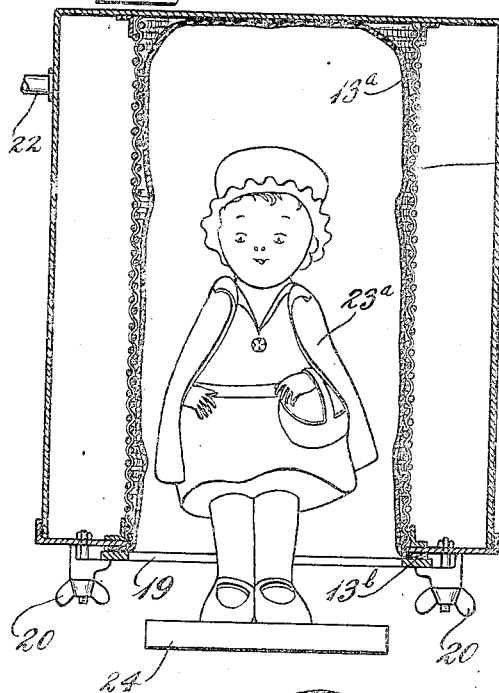
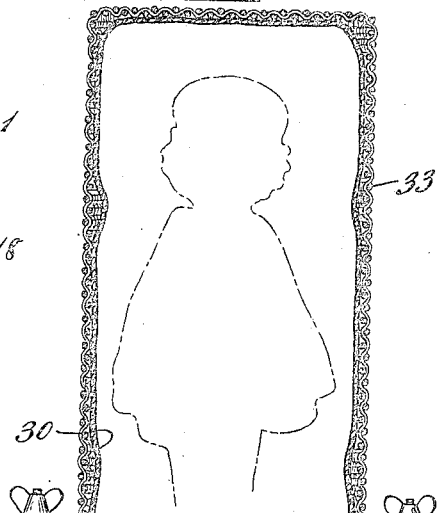
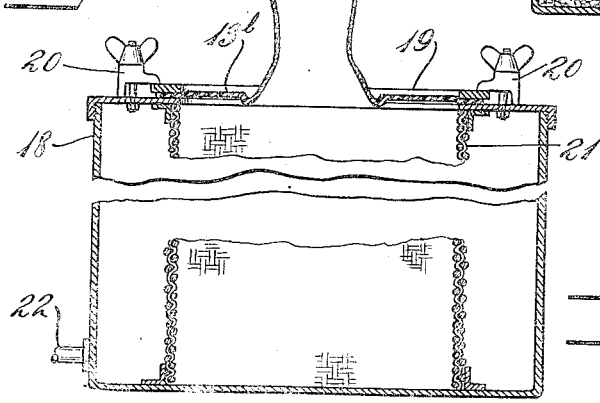
Inventor
Carl L. Beal
By Eakin & Avery
Attys.

Patented July 26, 1938

2,124,871

UNITED STATES PATENT OFFICE 2,124,871

METHOD AND APPARATUS FOR MOLDING ARTICLES

Carl L. Beal, Cuyahoga Falls, Ohio, assignor to American Anode, Inc., Akron, Ohio, a corporation of Delaware Application December 9, 1933, Serial No. 701,655

15 Claims. (Cl. 18—41)

This invention relates to procedure and apparatus for molding articles of plaster and similar material and particularly to economical means for reproducing in plaster rapidly and with exceptional accuracy of detail articles of any desired shape.

Prior methods of reproducing articles in plaster have presented many disadvantages among which may be mentioned poor reproduction of details in design, presence of mold marks upon the articles resulting from the use of split molds, short life and necessity for frequent replacement of molds which usually have been made of a glue or gelatine composition, high cost of molds made by prior methods, necessity of keeping large numbers of expensive molds tied up for considerable periods while the molded plaster is setting sufficiently to be removed from the mold and to be handled, and other difficulties and disadvantages.

The chief objects of the present invention accordingly are to provide a rapid and inexpensive method and apparatus for faithfully and accurately reproducing in plaster or other moldable material, articles of any desired shape and embodying the most intricate and detailed designs; to provide such a method which will involve none of the above-mentioned disadvantages of prior methods; to provide a novel one-piece rubber mold or matrix for molding articles; and to provide novel means for freeing the molded articles from the mold or matrix. Other objects will be apparent from the following description of the invention.

Briefly, the method of the present invention in a preferred embodiment comprises making a one-piece elastic distensible matrix interiorly corresponding accurately to the shape of an article to be reproduced, filling the matrix with plaster of Paris or other suitable molding composition, setting the plaster to form a self-sustaining, although not necessarily completely hardened shaped mass of plaster, then by differential pressure means uniformly distending the elastic matrix sufficiently to free it from the shaped plaster mass, and removing the matrix from the mass.

A preferred method of making the one-piece distensible matrix and preferred apparatus for distending the matrix to allow removal of the molded article will be described in detail with reference to the accompanying drawings in which Fig. 1 is an elevation partially in section, illustrating the first steps of the present method and showing a model of an article to be reproduced mounted upon a supporting plate and immersed in a liquid rubber dispersion.

Fig. 2 is an elevation of the model and plate of Fig. 1 after the application of an enveloping coating of rubber, the rubber coating being partially broken away and the figure being shown partially in section for clarity of illustration.

Fig. 3 is a perspective view of the rubber coating, constituting an elastic distensible rubber matrix, after being stripped from the model.

Fig. 4 is a sectional elevation of the elastic matrix filled with plaster and mounted in a preferred apparatus for distending the matrix and freeing the molded plaster article.

Fig. 5 is a sectional elevation of the molding apparatus showing the matrix in a distended condition being removed from the molded plaster article.

Fig. 6 is an elevation of the molding apparatus showing the matrix in position for cleaning.

Fig. 7 is a sectional elevation of a rubber matrix in conjunction with an alternative apparatus for distending the matrix and freeing the molded article therein.

For purposes of illustration, the article to be reproduced has been represented as a small doll of irregular configuration. A master model 10 of the doll is made in any desirable manner and of any suitable material and is mounted upright upon a metal plate 11 as by means of a screw 12 passing through the plate and into the model. The plate and model then are coated with a relatively thin enveloping layer of rubber 13 for example about $\frac{1}{16}$-inch thick, preferably by dipping the plate and model into natural liquid latex 14 contained in a tank 15, and deposting rubber upon the model and plate by any usual method, although the latex may be sprayed or otherwise applied to the plate and model to form a rubber deposit of the required thickness. The rubber then is dried and vulcanized in any usual manner. For securing the most accurate reproductions of the model, it has been found desirable during the drying and vulcanizing operations to apply vacuum to the inside of the rubber deposit, as by means of a suitable tubular connection 16 leading through the plate to the base of the model. Through this procedure, particularly if the model is of porous material, the rubber coating is pulled tightly against the surface of the model throughout the drying and vulcanization and the finest details of design upon the model are copied faithfully in the rubber. The dried and vulcanized rubber then is cut along the edges of the metal plate and is stripped from the model and contiguous portions of the plate to provide a one-piece elastic distensible matrix 13a interiorly corresponding accurately to the shape of the master model and having a filling opening 17 at its base with an integral rubber flange 13b extending outward from the matrix opening.

The matrix then is inserted into a non-collapsible pressure-tight chamber 18 through a suitable opening in one of its walls and the rubber flange 13b of the matrix is adhered to the margins of the opening with a suitable adhesive, which may be reenforced by pressure applied to an overlying flat ring 19 by several clamps 20 to provide a pressure-tight seal at the joint between the rubber flange and the walls of the chamber. A guard 21 of screen wire which may be lined with fabric is placed around the matrix at a small distance from the farthest projecting portion of the matrix, and the guard is secured to the walls of the chamber. The chamber is provided with a pipe connection 22 which may be connected to a vacuum pump. Thus, it will be seen that the rubber of the matrix and the integral flange in effect constitute an elastic diaphragm closing the opening in the pressure-tight chamber and that by reducing the pressure within the chamber, the matrix may be distended substantially uniformly in all directions, the distension being limited however by the surrounding guard.

Having prepared the apparatus, the rubber matrix in its normal unstretched condition is filled with any suitable molding composition 23 such as plaster of Paris, and the composition is allowed to stand for a period to set and form a self-sustaining although preferably not completely hardened reproduction of the original model. When the plaster has hardened sufficiently, the molding apparatus preferably is inverted and placed over a flat surface 24 with the open end of the matrix down. Vacuum is applied to reduce the pressure within the space between the walls of the chamber and the distensible matrix, whereupon the matrix is distended and pulled away from the molded plaster article 23a and against the guard 21, as illustrated in Fig. 5, so that the molding apparatus may be lifted from the article which then is left standing upon the surface to be completley dried and hardened. After removal of the molded article, the vacuum is released and the elastic matrix assumes its normal undistended condition ready to be filled with plaster.

Occasionally it is necessary to clean the molding surface of the matrix to rid it of adherent bits of plaster etc. When this becomes necessary, air pressure is applied to the interior of the chamber, whereupon the matrix is caused to protrude from the chamber, inside out, as illustrated in Fig. 6 so that it may be readily cleaned. When the cleaning has been completed, vacuum again is applied and the matrix is pulled back inside the chamber to its normal position.

In an alternative method and apparatus (illustrated in Fig. 7) the differential pressures required to distend the matrix are obtained by increasing the pressure within the matrix instead of reducing the outside pressure as heretofore described. In molding articles according to this alternative method, a distensible flanged matrix 30, prepared as before, is filled with a molding composition which preferably is hardened to form a firm molded article 31. The matrix, containing the molded article, then is temporarily but securely clamped over an opening in a pressure chamber 32, with the matrix extending out from the chamber opening instead of into it as before. The matrix may be surrounded by a distention-limiting guard 33 removably mounted upon the pressure chamber and about the matrix. Thus, it is seen that the elastic matrix and its integral flange again constitute a distensible-diaphragm closing the opening in a pressure-tight chamber, and that in this embodiment, by applying air pressure to the interior of the chamber, the matrix will be distended to free the molded article which will drop down into the chamber. The chamber should contain padding 34 to prevent breakage of the article. The temporarily clamped matrix then may be removed from the chamber and the molded article lifted out through the chamber opening.

In molding small articles in an elastic distensible matrix of the type hereindescribed, no reenforcement or backing for the matrix is necessary because the tough latex rubber preferably used in making the matrix is sufficiently strong, even when the walls are thin, to support the weight of plaster and prevent distortion of the matrix. In molding larger articles, however, the weight of the plaster may be sufficient to stretch the rubber and to distort the matrix to some extent. In such cases, the matrix, while being filled with plaster and while the plaster is setting, may be immersed in a concentrated salt solution or other fluid having a specific gravity approximating that of the molding composition. In this manner, the pressures upon the two sides of the matrix may be substantially equalized and distortion of the elastic matrix during the molding operation prevented.

When molding articles having prominent projections such as the ears of animals which require in the rubber matrix corresponding relatively deep and small molding pockets or recesses, difficulty may be encountered by reason of entrapment of air in such recesses when the matrix is filled with molding composition, which results in the production of pits in the surface of the molded article. In such cases, the difficulty may be eliminated by distending the matrix before the molding composition has set, or even while it is being poured into the matrix, and then allowing it to contract to its normal undistended condition while the composition still is mobile. In this manner, entrapped air is expelled from within the matrix and the molding composition is caused to fill completely all recesses in the matrix to produce a perfect molded article.

Articles produced by the method of this invention correspond accurately in every detail with the model from which the matrix was made, and are entirely free of undesirable mold marks. The surfaces of plaster of Paris articles molded in rubber matrices have been found to be harder than those molded in glue and gelatine molds, presumably because the rubber does not absorb water from contiguous portions of the plaster composition as does the glue and gelatine, and consequently does not remove water needed for complete hydration of the plaster of Paris. The marked economies in manufacturing costs effected by the present invention are apparent. The rubber matrices may be made in large numbers rapidly and inexpensively from the same master models and the matrices will last for long periods of continuous use without loss of detail in the molded articles. The method provides for removal of the matrix from the molded article as soon as it has hardened sufficiently to be self-supporting, and long before it is hard enough to permit of direct handling such as is required in removing articles from prior types of molds. Consequently the same matrices may be used more often than heretofore. Articles of complicated shapes may be molded and easily removed from the distended matrix. Many other advantages will be apparent to those skilled in the art of molding plaster articles.

For simplicity of illustration, the manufacture and use in a molding operation of a single matrix has been shown in the drawings, but it is obvious that for commercial production, a number of matrices may be made simultaneously by mounting several models upon a plate and coating them with rubber to provide a diaphragm having a number of molding pockets which may be placed in a single vacuum or pressure chamber, each of the pockets being surrounded by a distension-limiting guard so that they may be distended and emptied simultaneously.

The method and apparatus of the present invention obviously may be employed in molding articles from hydraulic molding compositions other than plaster of Paris, including for example Portland cement and artificial stone, as well as flowable and solidifiable compositions of other types such as a readily solidifiable rubber latex compositions especially prepared for molding purposes, or compositions or materials such as candies or ices and even low melting metal alloys which are flowable within the range of temperatures to which rubber may be subjected without injury and which may be solidified by cooling, and it is therefore the intent to include within the scope of this invention the molding of shaped articles in the manner described from all such moldable compositions or materials.

Aqueous dispersions of rubber other than the preferred natural latex and even dispersions of rubber in non-aqueous vehicles, such as the so-called rubber cements, may be used in making the distensible matrices employed in the present invention. Such dispersions may be compounded with any suitable fillers, pigments, vulcanizing agents, or other compounding ingredients, and may be concentrated, diluted or otherwise conditioned as desired.

The principles of the invention may be employed in manners other than those indicated in the preferrred embodiments hereinabove described. For example, a hollow matrix having upon its outer surface details of a design to be molded may be made in any convenient manner and employed as a core about which a moldable composition is solidified, in which case, the core may be collapsed by the application internally of vacuum to facilitate its removal from the molded cavity. Other variations and modifications both in procedure and in apparatus and materials are possible, without departing from the spirit and scope of the invention as indicated in the appended claims.

I claim:

1. The method which comprises placing a solidifiable molding composition in contact with a shaped surface of a flexible elastic matrix, solidifying the composition to form in intimate contact with said surface a self-sustaining solidified mass, then changing the static fluid pressure concurrently on substantially the entire exposed surface of at least one side of the flexible matrix so that the pressure on the side thereof removed from the solidified mass will be lower than the pressure upon the opposite side thereof in contact with said mass, whereby the flexible matrix is freed from its intimate contact with the solidified mass.

2. The method which comprises placing a solidifiable molding composition in contact with a shaped surface of a flexible elastic matrix, solidifying the composition to form in intimate contact with said surface a self-sustaining solidified mass, then reducing the fluid pressure on the side of the matrix removed from the solidified mass relative to the pressure upon the opposite side thereof in contact with said mass, whereby the flexible matrix is freed from its intimate contact with the solidified mass.

3. The method which comprises making an elastic distensible matrix interiorly having the shape of an article to be produced, introducing into the matrix a solidifiable molding composition, solidifying the composition to form within the matrix a self-sustaining shaped article, reducing the fluid pressure upon substantially the entire exposed surface of the outside of the matrix relative to the pressure upon the inside thereof to distend the matrix sufficiently to permit easy removal of the article, and removing the article from the distended matrix.

4. The method which comprises making a distensible rubber matrix of pocket shape interiorly having the shape of an article to be produced, introducing into the matrix a solidifiable molding composition, solidifying the composition to form within the matrix a self-sustaining shaped article, distending the matrix by means of differential fluid pressures sufficiently to permit ready removal of the article but without effecting such removal, and thereafter removing the article from the distended matrix.

5. The method which comprises providing an elastic distensible rubber matrix interiorly corresponding to a model to be reproduced, filling the matrix with a flowable molding composition and immersing the filled matrix in a fluid composition having a specific gravity sufficiently near that of the molding composition to equalize the pressures on the two sides of the matrix sufficiently to prevent distortion of the elastic matrix, solidifying the molding composition to form within the immersed matrix a self-sustaining reproduction of the model, distending the matrix sufficiently to permit ready removal of the reproduction, and removing it from the distended matrix.

6. The method of molding an article which comprises providing an elastic distensible matrix of pocket shape interiorly corresponding to the desired article, filling the matrix with a flowable molding composition, preventing distortion of the filled matrix by surrounding it with a fluid composition having a specific gravity sufficiently near that of the molding composition substantially to equalize the pressures on the two sides of the matrix, solidifying the molding composition to form within the matrix a self-sustaining molded article, and removing the molded article from the matrix.

7. The method which comprises providing a one-piece distensible rubber matrix having a filling opening, filling the matrix with a solidifiable molding composition, solidifying the composition to form within the matrix a self-sustaining shaped article, placing the matrix, opening down, together with the shaped article, upon a base, reducing the static fluid pressure upon the outside of the matrix to distend the matrix sufficiently to free it from the article, and lifting the distended matrix from the article.

8. The method which comprises providing a one-piece distensible rubber matrix, suspending the matrix without reenforcement in a fluid medium, filling the un-reenforced matrix with a solidifiable molding composition, solidifying the composition to form within the matrix a self-sustaining mass constituting a molded article, reducing the static fluid pressure upon the outside of the suspended matrix to distend the matrix, and removing the molded article from the distended matrix.

9. Apparatus for molding articles, comprising a hollow one-piece distensible rubber matrix interiorly corresponding to the shape of an article to be molded and having a single aperture, an integral rubber flange extending from the margins of said aperture, a non-collapsible pressure-tight enclosure about said matrix and in sealing engagement with said flange providing a vacuum chamber about the outside of said matrix, and means for reducing the pressure in said vacuum chamber to distend said matrix sufficiently to permit removal of an article molded therein.

10. Apparatus for molding articles comprising a one-piece elastic distensible matrix interiorly corresponding to the shape of an article to be molded, differential pressure means for distending said matrix sufficiently to permit removal of an article molded therein, and a guard about the outside of said matrix to limit distension thereof.

11. Apparatus for molding articles, comprising a hollow one-piece distensible rubber matrix having a single aperture, an integral rubber flange extending from the margins of said aperture, a non-collapsible pressure-tight enclosure about said matrix and in sealing engagement with said flange providing a vacuum chamber about the outside of said matrix, means for reducing the pressure in said vacuum chamber to distend said matrix sufficiently to permit removal of an article molded therein, and a guard within said chamber and around said matrix to limit distension of the matrix.

12. Apparatus for molding articles, comprising a non-collapsible chamber having an opening therein, an extensible elastic diaphragm extending across said opening and provided with a molding pocket having when in an unstretched condition the form of an article to be produced, and means for changing the pressure within said chamber to distend said pocket sufficiently to permit ready removal of an article molded therein.

13. In an apparatus for molding articles, an elastic, flexible matrix of pocket shape interiorly corresponding to the shape of an article to be molded and having a single aperture at the open end of the pocket with an integral flange extending outward from the margins of said aperture, said matrix being formed of unmasticated latex rubber of sufficient thickness and strength to maintain substantially undistorted the shape of the molding pocket when filled with molding material and when the filled matrix is supported solely by the said flange but still being capable of distension under differential fluid pressures for removal of the molded article.

14. A method of producing a mold for making dipped rubber latex goods, said mold to simulate faithfully an original figured body, which comprises depositing and setting rubber latex on said original figured body until a rubber envelope of an elastic character but of sufficient thickness and rigidity to hold its shape when removed from the body and filled with an aqueous flowable casting composition is produced, removing the rubber envelope from said body while stretching and distorting it, filling the rubber envelope after it has recovered substantially the same shape possessed thereby on the body with an aqueous flowable casting composition capable of assuming the internal configuration of said envelope and setting in place to a porous condition, and removing the envelope from the set casting, whereby said casting affords a mold simulating faithfully the original figured body and into the pores of which the aqueous content of rubber latex tends to seep.

15. A method of making a reproduction of a figured body, which comprises producing upon said body, by deposition directly from liquid rubber latex, an enveloping coating of latex rubber closely conforming to the figured body, removing the rubber envelope from said body while stretching and distorting it, filling the envelope after it has recovered substantially the same shape possessed thereby on the body with a flowable aqueous casting composition capable of assuming the internal configuration of the envelope, solidifying the composition within the envelope, and removing the solidified composition constituting a faithful reproduction of the original figured body.

CARL L. BEAL.